(12) United States Patent
Zarom

(10) Patent No.: US 6,356,529 B1
(45) Date of Patent: Mar. 12, 2002

(54) SYSTEM AND METHOD FOR RAPID WIRELESS APPLICATION PROTOCOL TRANSLATION

(75) Inventor: Rony Zarom, Herzelia (IL)

(73) Assignee: Converse, Ltd., Tel-Aviv (IL)

(*) Notice: Subject to any disclaimer, the term of this patent is extended or adjusted under 35 U.S.C. 154(b) by 0 days.

(21) Appl. No.: 09/372,875

(22) Filed: Aug. 12, 1999

(51) Int. Cl.$^7$ .......................... H04J 3/02; H04L 12/46; H04L 12/66; G06F 13/00

(52) U.S. Cl. ................ 370/231; 370/401; 370/466; 709/203; 709/230; 709/249

(58) Field of Search ................ 370/230, 231, 370/235, 352, 353, 354, 389, 392, 395, 400, 401, 465, 466, 467; 455/517, 524; 704/243, 260, 275; 709/201, 203, 227, 230, 249

(56) References Cited

U.S. PATENT DOCUMENTS

| | | | |
|---|---|---|---|
| 5,550,984 A | * 8/1996 | Gelb | 395/200.17 |
| 5,555,244 A | * 9/1996 | Gupta et al. | 370/60.1 |
| 5,636,216 A | * 6/1997 | Fox et al. | 370/402 |
| 5,748,633 A | * 5/1998 | Lawler et al. | 370/401 |
| 5,771,459 A | * 6/1998 | Demery et al. | 455/517 |
| 5,809,233 A | * 9/1998 | Shur | 395/200.6 |
| 5,841,764 A | * 11/1998 | Roderique et al. | 370/310 |
| 5,894,478 A | * 4/1999 | Barzegar et al. | 370/401 |
| 5,896,383 A | * 4/1999 | Wakeland | 370/400 |
| 6,018,710 A | * 1/2000 | Wynblatt et al. | 704/260 |
| 6,038,233 A | * 3/2000 | Hamamoto et al. | 370/401 |
| 6,047,002 A | * 4/2000 | Hartmnn et al | 370/466 |
| 6,075,796 A | * 6/2000 | Katseff et al. | 370/466 |
| 6,094,578 A | * 7/2000 | Purcell et al. | 455/426 |
| 6,101,189 A | * 8/2000 | Tsuruoka | 370/401 |
| 6,115,393 A | * 9/2000 | Engel et al. | 370/469 |
| 6,185,208 B1 | * 2/2001 | Liao | 370/392 |

* cited by examiner

Primary Examiner—Alpus H. Hsu
(74) Attorney, Agent, or Firm—Sughrue Mion, PLLC

(57) ABSTRACT

A method and a system for translating between data transmitted according to the WAP network protocols and data transmitted according to IP protocols. The system and method enable the translation process to be performed as soon as a minimal portion of data has been received by the gateway translator. This minimal portion is determined according to rules, such as the type of received data and flags within the received data. Therefore, the translation process is performed according to an atomic, state machine mechanism only on the received data, rather than by forcing the gateway translator to open two complete sessions and then attempting to mediate between these sessions. Thus, the method and system of the present invention are much faster and efficient than those which are known in the background art.

39 Claims, 4 Drawing Sheets

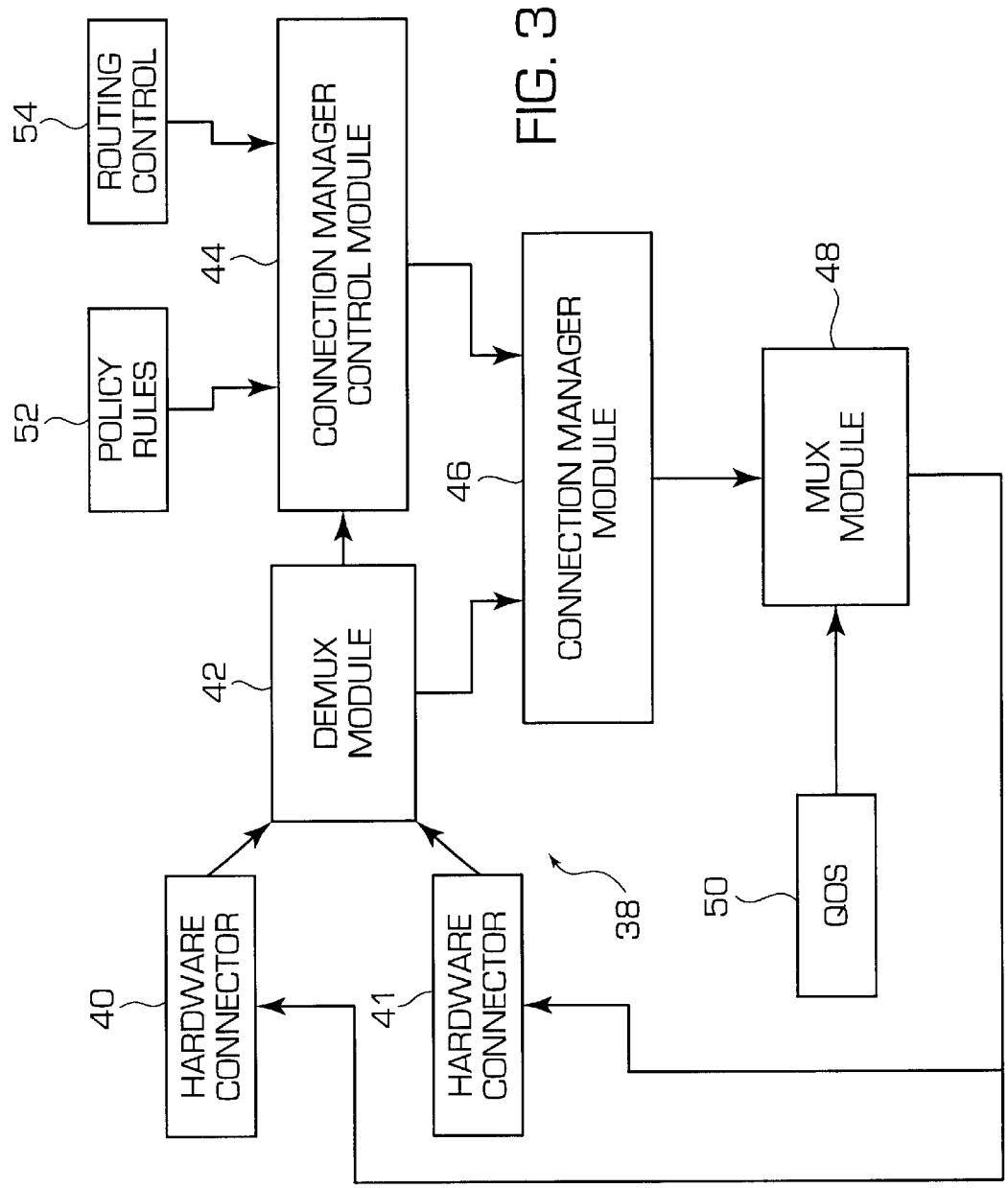

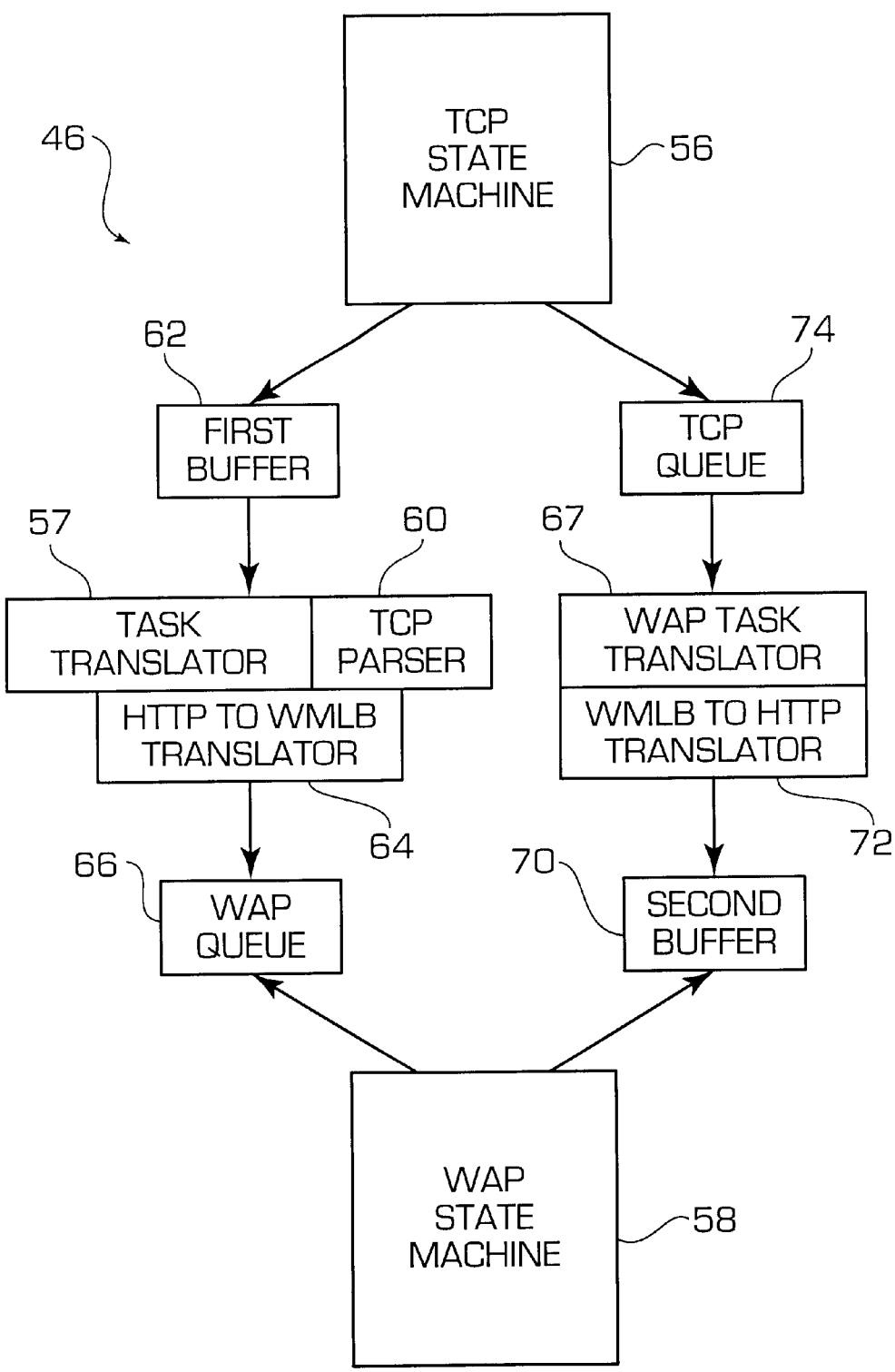

SYSTEM AND METHOD FOR RAPID WIRELESS APPLICATION PROTOCOL TRANSLATION

FIELD AND BACKGROUND OF THE INVENTION

The present invention relates to a system and method for rapid translation of data to and from the wireless application protocol (WAP) format, and in particular, for a system and method which enable real-time, "on the fly" translation through managing two separate, asynchronous sessions which are opened for communication both according to WAP and according to the current network protocols.

Cellular telephones are becoming increasingly popular for portable telephone use, particularly for users who are interested in rapid, mobile communication. As the amount of computational power and memory space which are available in such small, portable electronic devices increase, a demand has arisen for different types of communication services through such devices. In particular, users have demanded that cellular telephones receive many different types of multimedia data, including e-mail (electronic mail) messages and Web pages.

In response to such demands, and to extend the power and efficacy of operation of portable, wireless electronic communication devices, the WAP (wireless application protocol) standard has been developed. WAP is now the standard for the presentation and delivery of wireless data, including multimedia and other information, and telephony services, on mobile telephones and other types of wireless communication devices. WAP is designed to efficiently provide both multimedia and telephony services to such wireless communication devices, given the limitations of wireless networks and of the electronic devices themselves.

Wireless communication devices have requirements and drawbacks which are different than cable-linked electronic devices. For example, wireless networks are frequency significantly less stable than cable networks. Since users with such portable communication devices often operate these devices at different locations, the wireless network connection may not always be available, and may even suddenly become unavailable during a single communication session. In addition, the wireless communication devices themselves are more limited in terns of available resources than desktop computers. For example, such wireless communication devices typically have a less powerful CPU (central processing unit), less memory, a lower amount of available power since these devises are often battery-operated, and smaller display screens. Thus, wireless communication devices require adaptations of existing software and data transmission protocols in order to effectively deliver multimedia content from the Internet.

WAP provides the required adaptations and modifications to such software and data transmission protocols in order to meet the requirements of wireless communication devices. For example, HTML (Hyper-text Mark-up Language) has been adapted to form WML (Wireless Mark-up Language). As explained in greater detail below, other adaptations and modifications have also been made, such that wireless communication devices require a translation system, or gateway, in order to communicate with computational devices being operated according to the current network protocols.

Background art FIG.1 is a schematic block diagram of currently available systems for providing connectivity between wireless communication devices operating according to WAP and computational devices being operated according to the current network protocols. A translation system 10 has a wireless communication device client 12, operating a WAP-compatible software agent 14. Requests are sent from wireless communication device client 12 to a proxy server 16. Proxy server 16 must receive an entire WAP-compatible request before translating into an original network protocol request, for example by translating WAP protocol instructions to HTTP and TCP/IP instructions. The translated request is then passed to an original server 18, which operates such software as CGI scripts 20 and which provides content 22.

The same process must also be followed in reverse when original server 18 serves the requested content. Proxy server 16 must receive the entirety of the requested content from original server 18 before translating the requested content into a WAP-compatible format. The translated content is then served to wireless communication device client 12 by proxy server 16.

In addition, proxy server 16 can only translate the data at the highest (application) level of the wireless or wired network protocols, which significantly decreases the efficiency of the translation process. The data must therefore be converted through all of the network layers before translation, and must then be reconverted to a format which is suitable for transmission through the physical network media, whether wired (cables) or wireless.

Clearly, background art system 10 has serious, significant disadvantages. First, two separate sessions are operated with significant delays in each session for the translation process, as proxy server 16 waits for the translation process to be completed for each of original server 18 and wireless communication device client 12 before the translated data can be passed to the other session. Thus, since proxy server 16 must translate the entirety of the received information before passing it to the recipient, the translation process introduces significant delays. Background art system 10 is clearly inefficient and time consuming.

A more useful solution would be able to pass translated information as soon as only a portion is translated, such that the waiting period is significantly reduced. Furthermore, such a solution would allow a simple translating device, thereby decreasing the complexity of the gateway. Unfortunately, such a solution is not currently available.

There is thus a need for, and it would be useful to have, a system and a method for rapidly translating data being transmitted according to WAP into known network protocol data, without requiring the operation of two separate, simultaneous sessions, and without waiting for the entirety of the data before beginning the process of translating the data, such that the data is efficiently translated to and from a WAP-compatible format in real-time, without delays.

BRIEF DESCRIPTION OF THE DRAWINGS

The foregoing and other objects, aspects and advantages will be better understood from the following detailed description of a preferred embodiment of the invention with reference to the drawings, wherein:

FIG. 3 is a schematic block diagram of an exemplary gateway translator according to the present invention; and FIG. 4 is a schematic block diagram of an exemplary connection manager from the gateway translator of FIG. 3.

SUMMARY OF THE INVENTION

Figure 1:
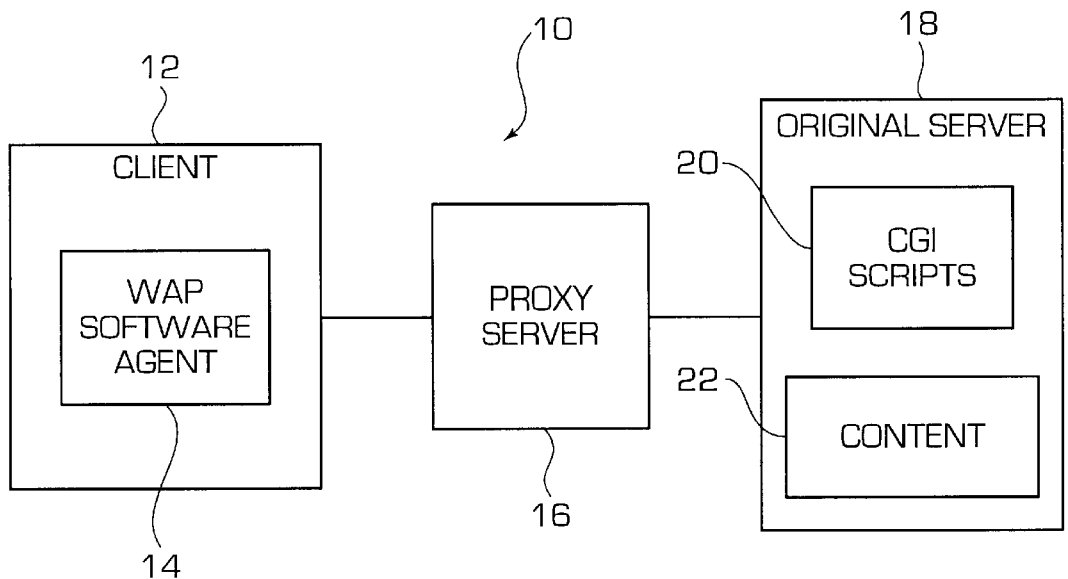
FIG. 1 is a schematic block diagram of a system according to the background art.

The present invention is of a method and a system for translating between data transmitted according to the WAP network protocols and data transmitted according to known network protocols, other than WAP protocols, such as known network protocols which are currently used for transmission of data on wired networks. The system and method of the present invention enable the translation process to be performed as soon as a minimal portion of data has been received by the gateway translator. This minimal portion is determined according to rules, such as the type of received data and flags within the received data. Therefore, the translation process is performed according to an atomic, state machine mechanism on the smallest translatable unit of received data, rather than by waiting for a complete set of steps to occur by each session before the process of translation is continued. Thus, the method and system of the present invention are much faster and efficient than those which are known in the background art.

According to the present invention, there is provided a system for translating a unit of data from a first type of network protocol to a second type of network protocol, the system comprising: (a) a network for transporting the unit of data; and (b) a translator gateway for receiving at least a portion of the unit of data, the translator gateway comprising: (i) a demux module for determining a type of a format for the at least a portion of the unit of data, such that the at least a portion of the unit of data is in a first format of the first type of network protocol; and (ii) a connection manager for determining if the at least a portion of the unit of data is sufficient to translate from the first type of network protocol to the second type of network protocol and for translating the at least a portion of the unit of data from the first type of network protocol to the second type of network protocol, such that the at least a portion of the unit of data is in a second format of the second type of network protocol.

According to another embodiment of the present invention, there is provided a method for translating a unit of data from a first type of network protocol to a second type of network protocol, the unit of data being transported on a network, the method comprising the steps of (a) receiving at least a portion of the unit of data from the network; (b) determining a format for the at least a portion of the unit of data, such that the at least a portion of the unit of data is in a first format of the first type of network protocol; (c) analyzing the at least a portion of the unit of data to determine if the at least a portion of the unit of data is sufficient for performing the translation to the second type of network protocol; and (d) if the at least a portion of the unit of data is sufficient, performing the translation to the second type of network protocol to form a translated unit of data, thereby obviating a need for receiving the entirety of the unit of data before initiating the translation.

Hereinafter, the term "network" refers to a connection between any two electronic devices which permits the transmission of data.

Hereinafter, the term "wireless device" refers to any type of electronic device which permits data transmission through a wireless channel, for example through transmission of radio waves. Hereinafter, the term "cellular phone" is a wireless device designed for the transmission of voice data and/or other data, through a connection to the PSTN (public switched telephone network) system.

Hereinafter, the term "computer" includes, but is not limited to, personal computers (PC) having an operating system such as DOS, Windows™, OS/2™ or Linux, Macintosh™ computers: computers having JAVA™ as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system. Hereinafter, the term "Windows" includes but is not limited to Windows95™, Windows 3.x™ in which "x" is an integer such as "1", Windows NT™, Windows98™, Windows CE™ and any upgraded versions of these operating systems by Microsoft Corp. (USA).

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group.

Hereinafter, the term "applet" refers to a self-contained software module written in an applet language such as Java or constructed as an ActiveX™ control.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computer hardware and operating system according to which the software application is executed. Examples of suitable programming languages include, but are not limited to, C, C++ and Java.

DETAILED DESCRIPTION OF THE INVENTION

The present invention is of a method and a system for translating data transmitted according to the WAP network protocols to, and from, data transmitted according to known network protocols. The system and method of the present invention enable the translation process to be performed, as soon as a minimal portion of data has been received by the gateway translator. This minimal portion is determined according to the current state of the translator, which may be affected by various factors, such as the type of received data and flags within the received data. Therefore, the translation process is performed in the lower protocol layers, rather than requiring the packet or a buffer of data to be transformed into higher layers according to an atomic, state machine mechanism only on the received data. Thus, the method and system of the present invention are much faster and efficient than those which are known in the background art.

Preferably, a plurality of task translators is created within each gateway translator, each being invoked for performing a specific translation task to translate a particular portion of data. Creating a plurality of such task translators enables a plurality of translation tasks to be performed simultaneously, as well as enabling a variety of different types of data to be translated. More preferably, an atomic translation module performs the basic, low level task of searching through a LUT (look-up table) for each part of the data to translate. The task translator then performs the process of translating specific layer 3 (application layer data), including determining when the process of translation can begin. An associated state machine then manages the overall process for translation, in particular the optional but preferred process for translating between TCP and WTP data and the process for packaging the translated data into a corresponding packet.

In addition, it should be noted that the system and method of the present invention could also be more generally used for translating a unit of data transported on a network from a first type of network protocol to a second type of network protocol. Therefore, the present invention is useful for many different types of translations of network protocols, rather than simply wired network protocols and WAP network protocols. However, for the purposes of clarity only and without intending to be limiting, the following discussion centers upon the translation of data between the known Internet (IP) network protocol and WAP network protocols as an example of the present invention.

The principles and operation of a system and a method according to the present invention may be better understood with reference to the drawings and the accompanying description, it being understood that these drawings are given for illustrative purposes only and are not meant to be limiting.

Figure 2:
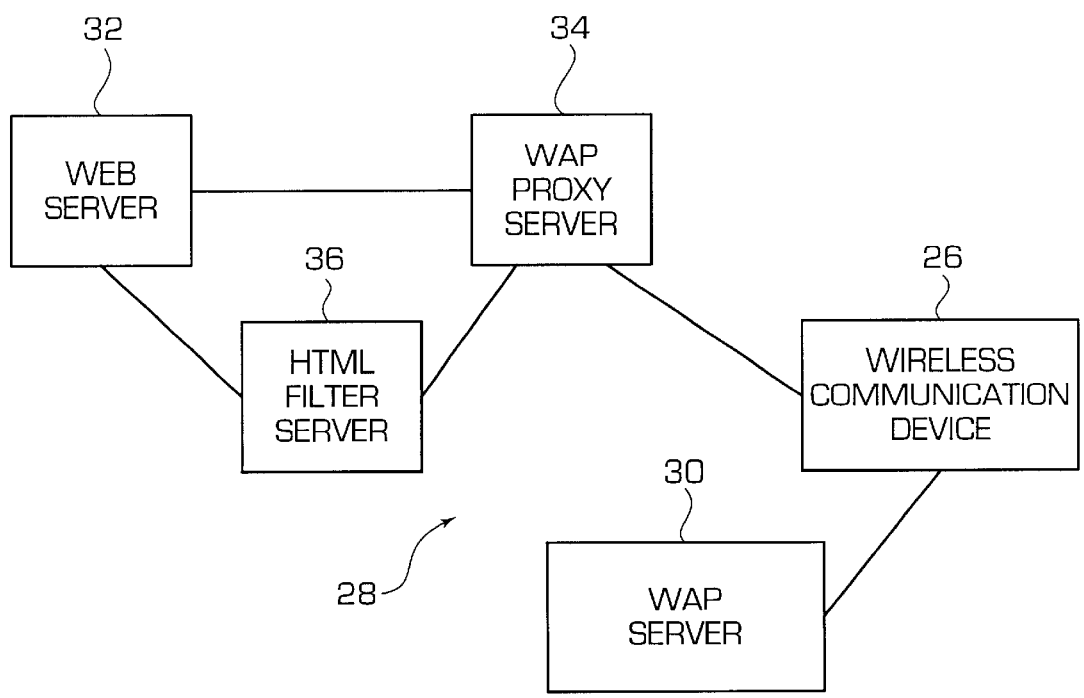
FIG. 2 is an exemplary WAP network which includes the translator/filter of the present invention.

Referring now to the drawings, FIG. 2 is a schematic block diagram of an exemplary WAP network system 24, with regard to receiving WML (wireless mark-up language) content as the exemplary type of data to be transmitted. As shown, a wireless communication device 26 receives binary WML (WMLB) for displaying a Web page, for maximum data transmission in the limited bandwidth available. Wireless communication device 26 is connected to a wireless network 28. Wireless network 28 is connected to a WAP server 30 for receiving WML or other WAP content, directly produced as binary WML for example. Thus, wireless communication device 26 is able to communicate directly with WAP server 30 and to receive binary WML content directly from WAP server 30.

An HTTP Web server 32 is also shown, connected to a WAP proxy server 34. WAP proxy server 34 is connected to wireless network 28, and is also able to provide binary WML to wireless communication device 26. WAP proxy server 34 receives WML content, optionally directly from HTTP Web server 32, if it is capable of serving such content. Alternatively, WAP proxy server 34 receives WML content from an HTTP filter server 36, which translates HTTP content from HTTP Web server 32 to WML content for serving to WAP proxy server 34. HTTP filter server 36 can be implemented as a translator gateway according to the present invention, for greater efficiency of operation of WAP network system 24, as described below with regard to FIG. 3.

FIG. 3 is a schematic block diagram of the functional modules of a translator gateway according to the present invention. It should be emphasized that these functional modules could be implemented in a variety of different ways, including as software or as hardware, for example. It should also be emphasized that FIG. 3 shows the overall functionality of the gateway and of the relationships between the different functional modules, rather than any absolute system architecture.

A gateway translator 38 receives packets from at least one known Internet (IP) wired network hardware connector 40 and at least one wireless communication network hardware connector 41, of which only one each is shown for the purposes of illustration only and without intending to be limiting in any way. Optionally, wired hardware connector 40 could be combined with wireless communication network hardware connector 41. Packets received from wired network hardware connector 40 are passed to a demux module 42. Demux module 42 examines the IP header of the packet to determine the source and destination IP addresses of the packet. Packet type is preferably determined by examining the protocol field in the IP header in order to distinguish between the different types of packets.

Packets received by gateway translator 38 may be one of two types: regular IP packets; and WAP packets or other wireless network packets. Gateway translator 38 has the advantage that the translation process is performed entirely at the IP level, rather than requiring stripping of various layers until the data is translated at the application level, for example between HTML and WMLB. As described previously, currently available translators in the art require the data to be translated only at the highest (application) level of the network protocols, which significantly decreases the efficiency of these background art translators. Thus, gateway translator 38 is more efficient and is therefore able to translate packets more rapidly from protocol type to the other than background art translators.

Once the packet type, and source and destination IP addresses of the packet have been determined, demux module 42 passes this information to a connection manager control module 44. Connection manager control module 44 examines the information, and compares this information about the received packet to the information for existing sessions with other network elements. If the received information corresponds to information for an existing session, then the packet is considered to be part of that existing session and is passed to the corresponding connection manager module 46. Alternatively, connection manager control module 44 invokes a new connection manager module 46 if the packet belongs to a new session, for which such a connection manager module 46 has not yet been invoked.

As described in greater detail with regard to FIG. 4 below, connection manager module 46 performs the translation of the packet into the corresponding network protocol as necessary, and then repackages the packet for transmission on the network. For example, if connection manager module 46 receives a regular IP packet for translation into a WAP network packet, then connection manager module 46 both performs the translation and repackages the translated packet data into a suitable format for a WAP network packet.

Connection manager module 46 then passes the repackaged packet data to a mux module 48, for transmission on the network. Mux module 48 is shown as being connected to both wired network hardware connector 40 and wireless communication network hardware connector 41 in order to demonstrate that the process of receiving, translating and transmitting is actually circular, in that both the wired and wireless networks are able to communicate to each other by sending and receiving data through translation gateway 38.

Mux module 48 preferably queues the prepared packets for transmission on the correct network according to a priority rating. For example, certain types of packets could be given higher priority according to a criterion which is measured by mux module 48. These packets could then be given a higher priority for a more rapid transmission on the respective network. More preferably, mux module 48 determines the priority rating according to at least one quality of service rule which is received from a quality of service (QOS) module 50.

According to a preferred embodiment of connection manager control module 44, each packet is also examined according to a policy rule in order to determine if the translation process should be performed. Such a policy rule could include a security rule for determining if the packet is allowed to enter translation gateway 38, and hence to pass through translation gateway 38 to the other type of network. More preferably, connection manager control module 44 receives the policy rule or rules from a policy rules module 52. In addition, control manager control module 44 also more preferably receives routing information from a routing control module 54, in order to pass any necessary routing data to connection manager 46 for the preparation of the repackaged packet data.

FIG. 4 is a schematic block diagram of an exemplary embodiment of connection manager 46 in more detail. Connection manager 46 controls the overall process of translation. First, connection manager 46 receives each packet from demux module 42 or connection manager control module 44. As described previously with regard to FIG. 3, connection manager 46 can receive two different types of packets: a regular IP network protocol packet, or a WAP (wireless) protocol packet.

A brief explanation of the WAP network layers is provided in order to explain the differences and similarities between TCP and WTP packets (see for example *WAP Architecture Specification*, version 30-April-1998, incorporated herein by reference, which is available at http://www.wapforum.org as of Jul. 9, 1999, for a more detailed discussion of these network layers). WTP operates in conjunction with UDP (user datagram protocol) services as a light-weight transaction oriented protocol, which is suitable for wireless networks. WTP is able to provide reliable datagram services without unnecessary information, such as data related to problems of packet order, which are only experienced in wired and not wireless networks. Furthermore, WTP provides error handling services and other transaction-related services.

As connection manager 46 receives each packet from demux module 42 or connection manager control module 44, connection manager 46 also receives the identification of the type of each packet from demux module 42. Connection manager 46 then passes each packet to the proper state machine according to the packet type. For example, if the packet is a TCP packet, the packet is passed to a TCP state machine 56. Alternatively, if the packet is a WAP packet, the packet is passed to a WAP state machine 58. The following description centers upon the translation of TCP packets to WTP packets, it being understood that a similar process is followed for the reverse type of translation.

TCP state machine 56 first removes the IP header from the TCP packet. TCP state machine 56 also examines the IP header in order to determine the type of data contained within the packet. Next, TCP state machine 56 passes the packet to a translator task module 57, according to the type of data contained within the packet.

Translator task module 57 then examines the data in order to determine if sufficient information has been received in order to begin the process of translation. Generally, there are three possible situations in this regard: the entire packet may be translatable; only part of the packet may be translatable; or none of the packet may be translatable. Each situation depends upon the data contained within the packet. For example, when HTTP content is being sent in a packet or a plurality of packets, translator task module 57 would examine the HTTP header, which is typically contained in the first TCP packet, and is usually contained in a single packet. Subsequent packets, containing the HTTP commands themselves, may not be translatable as individual packets, such that a plurality of such packets must be received before the process of translation can begin.

In order to differentiate between these possibilities, translator task module 57 preferably features a TCP parser 60 for parsing the data in the packet. TCP parser 60 more preferably features a language tree, such that each part of the data is read as TCP parser 60 descends down the tree. TCP parser 60 most preferably continues reading data and traveling through the tree until a leaf is reached. At this point, translator task module 57 is able to determine that the smallest unit of translatable data for this packet and/or concatenated packets has been located.

If none of the packet is translatable, then translator task module 57 must wait for another packet or packets to arrive before the process of translation is continued. For example, actual HTTP commands are typically sent in a plurality of packets, such that translator task module 57 preferably analyzes the received data with a sliding window. As soon as sufficient HWTP command data has been received for translation, translator task module 57 sends that portion of the HTTP command data to be translated to WSP data. The window is then moved such that the next portion of HTTP command data is examined and translated. A similar process may be performed in order to translate HTML data to WMLB data. Thus, translator task module 57 preferably enables the process of translation to begin as soon as sufficient data is received, which is determined according to the type of data being translated.

Alternatively, translator task module 57 separates that portion of the packet which is translatable, which as noted previously may include substantially the entirety of the packet. Translator task module 57 more preferably begins the process of translating the data in the TCP packet into the corresponding WAP format data as soon as sufficient data have been received. Therefore, translator task module 57 may begin the process of translation with a single TCP packet, unless a plurality of such packets is required in order to process the information. Optionally and most preferably, translator task module 57 is able to begin the process of translation with a portion of a single TCP packet, such that translator task module 57 then concatenates these portions of packets to form an entire packet. Since TCP packets may optionally arrive out of order, translator task module 57 is preferably able to read the header in order to determine the correct packet order, for example when a plurality of TCP packets must be concatenated before the process of translation can begin.

Once the smallest translatable unit of data in the packet and/or packets has been located, translator task module 57 transfers this smallest translatable unit of data to a first buffer 62. A HTTP to WSP translator 64 reads the unit of data from first buffer 62 and translates it to the corresponding WSP data format according to a LUT (look-up table). Such a LUT is provided in the WAP specification, as incorporated by reference, and as such is not discussed in further detail herein.

HTTP to WSP translator 64 optionally and preferably handles the repetitive data translation tasks of looking for each portion of data in the LUT in order to determine the proper translation. Therefore, HTTP to WSP translator 64 preferably performs the simplest task underlying the translation process, while translator task module 57 manages the overall translation task for each translatable unit of data. More preferably, HTTP to WSP translator 64 only translates specific layers of data, such as layer 5 (HTTP translations). Data related to headers for other layers are most preferably flagged by TCP state machine 56, such that HTTP to WSP translator 64 preferably ignores this data during the translation process.

After HTTP to WSP translator 64 has translated the data, the translated data is optionally and preferably placed in a WAP queue 66. WAP state machine 58 then removes data from WAP queue 66 in chunks of a suitable size for packaging into WAP packets. For example, WAP state machine 58 preferably adds the necessary translated headers in order to package the data into a WTP packet suitable for transmission on the wireless network. More preferably, the header data for each packet is translated separately, such that WAP state machine 58 is able to build a WAP header for the WAP packet according to a one-to-one correspondence of headers. WAP state machine 58 then passes the packet to mux module 48 for transmission (not shown). The WAP packet is then transmitted to the wireless communication device (not shown).

In addition, WAP state machine 58 optionally and preferably is able to "spoof" packets which do not contain any translated data, but which must be constructed and transmitted in order for the connection between gateway translator 38 and the data server, or other network element, to remain open, or to otherwise facilitate communication between gateway translator 38 and a network element. This creates a steady flow of packets which facilitates such communication, for example in order to prevent a "time out" from occurring.

Similarly, communication manager 46 also contains components for permitting WAP packets to be translated into TCP packets. In this situation, WAP state machine 58 first receives the packet and transmits the packet to a WAP task translator 67. Once sufficient data has been received in order to begin the process of translation, WAP task translator 67 passes the data to a second buffer 70. A WSP to HTTP translator 72 then receives the parsed data from second buffer 70, and translates the data as previously described, but in the opposite orientation (from WAP data, such as WSP, to TCP data, such as HTTP). The translated data is then passed to a TCP queue 74.

TCP state machine 56 receives the translated data, and prepares a TCP packet in a process which is similar to that described for preparing WAP packets. Again, preferably the headers are translated separately in order to permit tie packet to be properly constructed as a TCP packet. TCP state machine 56 can also spoof TCP packets, substantially as previously described for WAP packets, Also preferably, an additional WTP binary translator (not shown) is also able to translate WML data into WML binary data for transmission to the wireless communication device. As described previously, wireless communication devices preferably receive WML data in a binary format, WMLB, in order to increase the amount of data which can be translated in the limited bandwidth which is available on the wireless network.

The system and method of the present invention clearly have a number of advantages over currently available background art methods. For example, if a proxy server is used for the translation process, two separate sessions are conducted such that each session must wait for the other to complete a communication with the proxy server before the process of translation can begin. This is clearly inefficient and causes a significant amount of time to be wasted in simply waiting for the other session to complete. By contrast, in the system and method of the present invention, the two separate sessions are managed simultaneously and asynchronously, such that each session does not need to wait for the other session to complete before beginning the process of translation. Furthermore, the system and method of the present invention bypass requirements for such time consuming steps as handshakes, and instead initiate a direct connection to the data server or other network element. Also, the present invention is able to analyze and translate data in its raw form, from the network as packets, while the background art requires such data to be concatenated into a buffer before translation. Thus, the system and method of the present invention are clearly more efficient and are able to perform translation at a more rapid rate than currently known background all systems and methods.

It will be appreciated that the above descriptions are intended only to serve as examples, and that many other embodiments are possible within the spirit and the scope of the present invention.

What is claimed is:

1. A system for translating a unit of data from a first type of network protocol to a second type of network protocol, the system comprising:
   (a) a network for transporting the unit of data; and
   (b) a translator gateway for receiving a portion of the unit of data, said translator gateway comprising:
      (i) a demux module for determining a type of a format for said portion of the unit of data, such that said portion of the unit of data is in a first format of the first type of network protocol; and
      (ii) a connection manager for analyzing the portion of unit of data to identify the type thereof so as to determine a smallest amount or sufficiently translatable data, and determining if said portion of the unit of data is sufficient to translate from the first type of network protocol to the second type of network protocol, and when determined to be sufficient for translation, for translating said portion of the unit of data from the first type of network protocol to the second type of network protocol.

2. The system of claim 1, wherein the unit of data is a packet featuring a header, and said demux module determines the first type of network protocol by analyzing said header.

3. The system of claim 2, wherein said connection manager further comprises:
   (1) a first state machine for determining a type of data contained in the packet;
   (2) a first parser for parsing said portion of the unit of data to form parsed data and to determine that said portion of the unit of data is sufficient to translate from the first type of network protocol to the second type of network protocol; and
   (3) a first translator for translating said parsed data to form translated data.

4. The system of claim 3, wherein said connection manager further comprises:
   (3) a second state machine for receiving said translated data and for packaging said translated data into a second unit of data in said second format of the second type of network protocol.

5. The system of claim 4, wherein said first translator features a LUT (look-up table) containing information for translating between the first type of network protocol and the second type of network protocol.

6. The system of claim 5, wherein the first type of network protocol is a wired network protocol and the second type of network protocol is a wireless network protocol.

7. The system of claim 6, wherein said wireless network protocol is WAP (wireless application protocol).

8. The system of claim 5, wherein said first translator gateway includes a plurality of connection managers, and said first translator gateway further comprises:
   (iii) a connection manager control module for examining the unit of data and for determining if a session for the unit of data is open, such that if said session is open, the unit of data is provided to one of said plurality of connection managers corresponding to said open session.

9. The system of clam 8, wherein said translator gateway further comprises:
   (iv) a policy rules module for holding at least one rule for determining if the unit of data is permitted to be translated.

10. The system of claim 9, wherein said translator gateway further comprises: p1 (v) a mux module for receiving said second unit of data and for transmitting said second unit of data on said network.

11. The system of claim 10, wherein said translator gateway further comprises:
   (vi) a quality of service module for determining a priority rating for transmitting said second unit of data.

12. A method for translating a unit of data from a first type of network protocol to a second type of network protocol, the unit of data being transported on a network, the method comprising:
   (a) receiving a portion of the unit of data from the network;
   (b) determining a format for said portion of the unit of data, such that said portion of the unit of data is in the first type of network protocol;
   (c) analyzing the portion of the unit of data to identify the type thereof so as to determine a smallest amount of sufficiently translatable data;
   (d) analyzing said portion of the unit of data to determine if said portion of the unit of data is sufficient for performing the translation to the second type of network protocol; and
   (e) if said portion of the unit of data is determined to be sufficient, then performing the translation to the second type of network protocol to form a translated unit of data, thereby obviating a need for receiving the entirety of the unit of data before initiating the translation.

13. The method of claim 12, wherein the unit of data is a packet featuring a header, and wherein said determining a format includes determining said format as the first type of network protocol by analyzing said header.

14. The method of claim 13, further comprising:
   (e) receiving the remaining portion of the unit of data from the network; and
   (f) translating said remaining portion of the unit of data from the first type of network protocol to the second type of network protocol.

15. The method of claim 14, wherein the first type of network protocol is a wired network protocol and the second type of network protocol is a wireless network protocol.

16. The method of claim 15, wherein said wireless network protocol is WAP (wireless application protocol).

17. The method of claim 16, wherein the first type of protocol is WML (wireless mark-up language) and the second type of protocol is HTML (hyper-text mark-up language).

18. The method of claim 16, further comprising packaging said translated unit of data as a complete unit of data according to the second type of network protocol.

19. The method of claim 14, further comprising:
   (g) creating a spoofed packet to maintain a connection to the network.

20. A method of translating a unit of data from a first type of network protocol to a second type of network protocol, the method comprising:
   receiving a portion of the unit of data and determining that the received portion of the unit of data is of the first type of network protocol; and
   analyzing the portion of the unit of data to identify the type hereof so as to determine a smallest amount of sufficiently translatable data;
   if said received portion of the unit of data is sufficient for translation to the second type of network protocol, then begin translating the received portion of the unit of data to the second type of network protocol while receiving the remaining portion of the unit of data.

21. The method of claim 20, wherein the unit of data is a packet, and wherein the first type of network protocol is determined by examining the packet's header.

22. The method of claim 20, wherein the first type of network protocol is a wired network protocol and the second type of network protocol is a wireless network protocol.

23. The method of claim 22, wherein the wireless network protocol is WAP (wireless application protocol).

24. The method of claim 20, further comprising translating the remaining portion of the unit of data to the second type of network protocol.

25. The method of claim 20, wherein the first type of network protocol is WAP protocol, and the second type of network protocol is HTTP.

26. The method of claim 20, wherein the first type of network protocol is a wireless network protocol and the second type of network protocol is a wired network protocol.

27. A network protocol translation system, comprising:
   a server for receiving a unit of data for translation from a first network protocol type to a second network protocol type, said server including a module, operable upon receiving a portion of the unit of data, for determining that the received portion of the unit of data is of the first network protocol analyzing the portion of the unit of data to identify the type thereof so as to determine a smallest amount of sufficiently translatable data, and for analyzing whether the received portion of the unit of data is sufficient for translation to the second network protocol, and if said received portion of the unit of data is sufficient for translation, then said server is operable to begin translating the portion of the unit of data into the second network protocol while receiving the remaining portion of the unit of data.

28. The network protocol translation system according to claim 27, wherein the unit of data is a packet, and wherein said server includes a module for determining the first type of network protocol by examining the packet's header.

29. The network protocol translation system according to claim 27, wherein the first network protocol is a wired network protocol and the second network protocol is a wireless network protocol.

30. The network protocol translation system according to claim 27, wherein said server includes a policy rules module for storing at least one rule for determining if a portion of the unit of data is sufficient for translation.

31. A network protocol translation system, comprising:
a server for receiving a unit of data for translation from a first network protocol type to a second network protocol type, said server including a module, operable upon receiving a portion of the unit of data, for determining that the received portion of the unit of data is of the first network protocol analyzing the portion of the unit of data to identify the type thereof so as to determine a smallest amount of sufficiently translatable data, and for analyzing whether the received portion of the unit of data is sufficient for translation to the second network protocol, and if said received portion of the unit of data is sufficient for translation, then said server is operable to begin translating the portion of the unit of data into the second network protocol while receiving the remaining portion of the unit of data, wherein the unit of data is a packet, and wherein said server includes a module for determining the first type of network protocol by examining the packet's header, and wherein said server includes a parser for determining if the received portion of the unit of data is translatable, said parser operating according to a language tree, and wherein each portion of said packet is read as said parser descends said language tree, and wherein said portion of the packet is translatable if said parser reaches a leaf of said language tree.

32. The network protocol translation system according to claim 28, wherein if said server determines that no portion of the packet is translatable, then said server waits until at least one additional packet is received before beginning to translate data.

33. A computer-readable medium embodying a program of instructions, said program comprising the instructions of:
receiving a portion of the unit of data and determining if the received portion of the unit of data is of the first type of network protocol;
analyzing the portion of the unit of data to identify the type thereof so as to determine a smallest amount of sufficiently translatable data; and
if said received portion of the unit of data is sufficient for translation to the second type of network protocol, then begin translating the received portion of the unit of data to the second type of network protocol while receiving the remaining portion of the unit of data.

34. The computer-readable medium of claim 33, wherein the unit of data is a packet, and wherein the first type of network protocol is determined by examining the packet's header.

35. The computer-readable medium of claim 33, wherein the first type of network protocol is a wired network protocol and the second type of network protocol is a wireless network protocol.

36. The computer-readable medium of claim 33, wherein the wireless network protocol is WAP (wireless application protocol).

37. The computer-readable medium of claim 33, further comprising translating the remaining portion of the unit of data to the second type of network protocol.

38. The computer-readable medium of claim 33, wherein the first type of network protocol is WAP protocol, and the second type of network protocol is HTTP.

39. The computer-readable medium of claim 33, wherein the first type of network protocol is a wireless network protocol and the second type of network protocol is a wired network protocol.

* * * * *

UNITED STATES PATENT AND TRADEMARK OFFICE
CERTIFICATE OF CORRECTION

PATENT NO.    : 6,356,529 B1  
DATED         : March 12, 2002  
INVENTOR(S)   : Zarom, Rony It is certified that error appears in the above-identified patent and that said Letters Patent is hereby corrected as shown below:

Title page,
Item [73], Assignee, delete "Converse", insert -- Comverse --;

Column 8,
Line 31, delete "HWTP", insert -- HTTP --;

Column 9,
Line 54, delete "tie", insert -- the --;

Column 10,
Line 66, delete "(3)";

Column 11,
Line 26, delete "p1";

Column 12,
Line 20, delete "hereof", insert -- thereof --.

Signed and Sealed this

Twenty-ninth Day of October, 2002

Attest:

JAMES E. ROGAN  
Attesting Officer     Director of the United States Patent and Trademark Office